M. FISCHER.
COMBUSTION ENGINE.
APPLICATION FILED JAN. 12, 1912.
1,103,901.
Patented July 14, 1914.
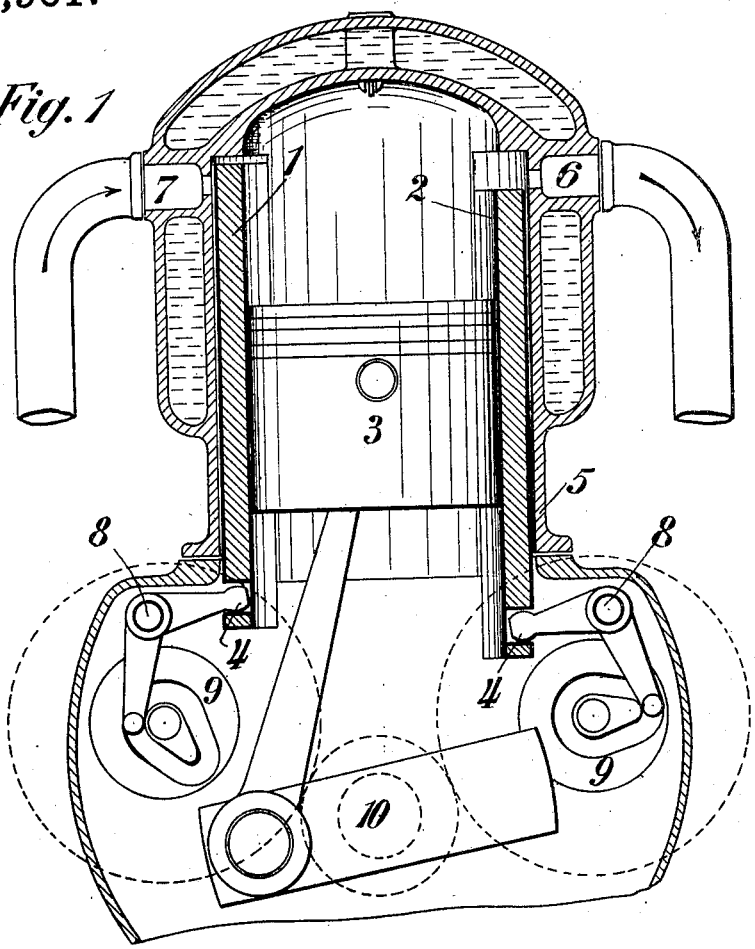
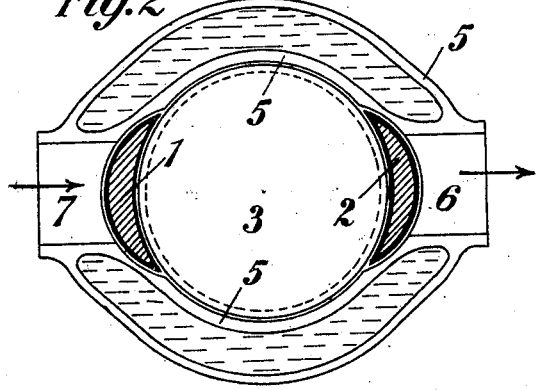
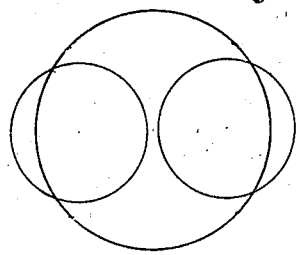
WITNESSES:
John C. Sanders
John A. Percival
INVENTOR:
Martin Fischer
BY Wm Wallace White
ATT'Y.

UNITED STATES PATENT OFFICE.

MARTIN FISCHER, OF ZURICH, SWITZERLAND, ASSIGNOR TO FISCHER MOTOR CORPORATION, A CORPORATION OF NEW YORK.

COMBUSTION-ENGINE.

1,103,901.

Specification of Letters Patent.

Patented July 14, 1914.

Application filed January 12, 1912. Serial No. 670,304.

*To all whom it may concern:*

Be it known that I, MARTIN FISCHER, citizen of Switzerland, residing at Zurich, Switzerland, have invented new and useful Improvements in Combustion-Engines, of which the following is a specification.

The subject matter of the present invention is an explosion motor with slide valve gear.

One form of carrying out this invention is shown in Figures 1 and 2, Fig. 1 representing a longitudinal section, Fig. 2 a transverse section of the cylinder and Fig. 3 illustrates a method of forming the cylinder and valve seats.

5 shows the cylinder with water jacket, 3 the piston while 1 and 2 represent the slide valves, which, as can be seen in Fig. 2, are of crescent shape and run in similarly shaped recesses in the inner wall of the cylinder. This peculiar form of slide valve permits the advantageous provision for an exact guideway for the slide valve in the cylinder and a good packing between the piston, the slide valve and the cylinder is secured by this construction. In Fig. 1 the slide valve gear is shown sidewise.

10 represents the crank shaft, on which the piston 3 acts by means of a simple connecting rod.

The already mentioned crescent shaped slide valves 1 and 2 in Fig. 2 reach downward into the crank case. On both sides of the crank are two curved cams 9, which rotate at half the number of the revolutions of the motor shaft 10 and are driven by the latter. The two angular levers, oscillating at 8 about a fixed point, engage on the one hand with pins in the slot of the curved cams 9, while they engage on the other hand the crescent shaped slide valves 1 and 2 in the openings 4. When the motor shaft rotates, the curved cams 9 rotate also, whereby the angular levers 8 are oscillated. The slide valves 1 and 2 being connected at 4 with the angular levers, they must necessarily move also. The cylinder 5 has an inlet opening at 7 for mixture and an exhaust opening at 6 for spent gases. The slide valves 1 2 cover these inlet and exhaust openings alternately at proper intervals, corresponding with the known working of the cycle of the motor.

The construction could be effected as follows: Both bores, forming the guide face of the slide valves, are made first in the solid cylinder. The slide valves, shaped out of a solid turned and lengthwise cut cylinder, are then placed in the bores and screwed tight from the outside, and only after that the bore of the piston is worked out. (Fig. 3.)

For larger motors with hollow cast cylinders the construction may also be carried out as follows: The working surfaces of the slide valves are first turned and finished on the circular grinding machine. The slide valves, still rough on the working surfaces of the piston, are then put into place and screwed fast and the cylinder is now bored and ground. The circular sections of all the working faces secure an easy working and a safe packing of the surfaces.

While I have shown and described a particular form of construction, it should be understood that I do not confine myself to this particular form, but various modifications may be made without departing from my invention. Such modifications may reside in changes in the exact form of valves or in the operating of the valves, or in the method of construction, and may vary in other respects.

What I claim and desire to secure by Letters Patent is:

1. In an internal combustion engine, in combination, a cylinder provided with inlet and outlet ports, a piston therein, slide valves crescent-shaped in cross-section coöperating with said ports and means to actuate said valves.

2. In an internal combustion engine, in combination, a cylinder provided with inlet and outlet ports, recesses formed in the cylinder constituting expanded portions of the inner wall with inwardly diverging sides beyond the normal cylindrical form of the lining of said cylinder, said recesses being open to the combustion chamber and connecting with said ports, a piston in said cylinder, valves mounted to slide longitudinally within said recesses and coöperating with said ports, and means to actuate said valves.

3. In an internal combustion engine, in combination, a cylinder provided with inlet and outlet ports, recesses formed in the walls thereof open to the combustion chamber and connecting with said ports; a piston in said cylinder, valves mounted to slide longitudinally in said recesses and coöperate with said ports, the inner face of said valves corresponding to the curvature of the cylinder, and means to actuate said valves.

4. In an internal combustion engine, in combination, a cylinder provided with a port near its head, a piston in said cylinder, a recess in the wall of the cylinder open to the combustion chamber, a valve adapted to move longitudinally of said piston in said recess and laterally removable therefrom into the cylinder when not held operatively in the recess by the piston, and means to actuate said valve.

5. In an internal combustion engine, in combination, a cylinder having a port near its head end, a piston in said cylinder supported by the walls of said cylinder, a recess in the wall of the cylinder crescent-shaped in cross-section transverse to the longitudinal axis of the cylinder, a valve in said recess adapted to be held in place by the piston, and means for actuating said valve.

6. An internal combustion engine, a cylinder, a port near the head thereof, a piston, a slide valve crescent-shaped in cross-section, a recess in the wall of the cylinder open to the combustion chamber to receive said valve, and means for actuating said valve.

7. An internal combustion engine, in combination, a cylinder provided with ports near its head end, a piston in said cylinder having its running support by engagement with the cylinder walls throughout a major portion of its circumference, a plurality of recesses formed in the cylinder wall extending in the aggregate less than half around the circumference of the piston and connecting with said ports, valves sliding longitudinally of said cylinder in said recesses and supported therein by said piston, and means for operating said valves.

8. An internal combustion engine, in combination, a cylinder, a piston, a slide valve crescent-shaped in cross-section, a recess formed in the wall of the piston and open to the cylinder space adapted to receive said slide valve between the piston and the cylinder wall, substantially as described.

9. In an internal combustion engine, a slide valve of crescent-shape cross-section the inner surface of which slides in contact with the piston.

10. In an internal combustion engine, a cylinder, a piston, a slide valve reciprocating longitudinally of the cylinder in a recess and held therein by engagement with the piston on its inner side and the inner wall of the cylinder on its outer side.

11. In an internal combustion engine, a cylinder, a port at one end of said cylinder, a longitudinal groove in the inner wall of the cylinder connecting with said port, the side walls of said groove diverging inwardly to the cylinder, a valve adapted to be placed in said recess laterally from within the cylinder, and removable means in the cylinder for holding the valve in operative position.

12. In an internal combustion engine, a cylinder, a recess in the inner wall of the cylinder with sides diverging into the cylinder, a member moving longitudinally of the cylinder in said recess and adapted at one end to actuate as a valve, a piston, combustion chamber at the valve end of the reciprocating member and means beyond the piston to actuate the other end of the reciprocating member.

In testimony whereof I have signed my name to this specification in the presence of two subscribing witnesses.

MARTIN FISCHER.

Witnesses:
JOHANNES AUMUND,
CARL GUBLER.